(12) United States Patent
Hebenthal et al.

(10) Patent No.: US 11,222,174 B2
(45) Date of Patent: Jan. 11, 2022

(54) SYSTEMS AND METHODS FOR GENERATING LOGICAL DOCUMENTS FOR A DOCUMENT EVALUATION SYSTEM

(71) Applicant: RELX Inc., New York, NY (US)

(72) Inventors: Douglas C. Hebenthal, Bellevue, WA (US); Cesare John Saretto, Greenbrier, TN (US); James Tracy, Murfreesboro, TN (US); Richard Clinkenbeard, Franklin, TN (US); Christopher Liu, Redmond, WA (US)

(73) Assignee: RELX INC., Miamisburg, OH (US)

( * ) Notice: Subject to any disclaimer, the term of this patent is extended or adjusted under 35 U.S.C. 154(b) by 0 days.

(21) Appl. No.: 16/838,570

(22) Filed: Apr. 2, 2020

(65) Prior Publication Data
US 2020/0320250 A1 Oct. 8, 2020

Related U.S. Application Data

(60) Provisional application No. 62/828,881, filed on Apr. 3, 2019.

(51) Int. Cl.
*G06F 40/197* (2020.01)
*G06F 40/169* (2020.01)
(Continued)

(52) U.S. Cl.
CPC ........ *G06F 40/197* (2020.01); *G06F 40/169* (2020.01); *G06F 40/279* (2020.01);
(Continued)

(58) Field of Classification Search
CPC .................. G06F 40/197; G06K 9/00469
See application file for complete search history.

(56) References Cited

U.S. PATENT DOCUMENTS

| 8,849,873 B2 | 9/2014 | Gorbaty |
| 2002/0087597 A1 | 4/2002 | Wilson |
| (Continued) | | |

OTHER PUBLICATIONS

EverMap, Recognize Text in Scanned PDF Documents, captured at https://www.evermap.com/Tutorial_ABM_OCR.asp, May 11, 2018, 7 pages (Year: 2018).*
(Continued)

*Primary Examiner* — Scott T Baderman
*Assistant Examiner* — Seung Woon Jung
(74) *Attorney, Agent, or Firm* — Dinsmore & Shohl, LLP

(57) ABSTRACT

Systems and methods for generating logical documents for a document evaluation system are provided. For example, a method for generating logical documents for a document evaluation system includes receiving a first child document associated with a master document. The master document includes one or more master terms. The first child document includes one or more first child terms and a first date. The method further includes generating a logical document based at least in part on the master document. The logical document includes one or more current document values. Each current document value corresponds to one master term and is associated with a current date and a current reference. The current reference identifies a region in the master document related to the one master term. The method further includes selecting a first child term from the one or more first child terms.

24 Claims, 7 Drawing Sheets

(51) Int. Cl.
    *G06F 40/279*  (2020.01)
    *G06K 9/00*    (2006.01)
    G06N 20/00    (2019.01)
    G06K 9/32     (2006.01)

(52) U.S. Cl.
    CPC ..... *G06K 9/00469* (2013.01); *G06K 9/00456* (2013.01); *G06K 9/3233* (2013.01); *G06N 20/00* (2019.01)

(56) References Cited

U.S. PATENT DOCUMENTS

| | | | |
|---|---|---|---|
| 2009/0281853 A1* | 11/2009 | Misvaer | G06Q 10/06 705/311 |
| 2010/0299327 A1 | 11/2010 | Kiefer et al. | |
| 2012/0284310 A1 | 11/2012 | Yager | |
| 2016/0140221 A1 | 5/2016 | Park et al. | |
| 2018/0005186 A1* | 1/2018 | Hunn | G06F 40/103 |
| 2018/0268506 A1* | 9/2018 | Wodetzki | G06K 9/628 |

OTHER PUBLICATIONS

PCT/US2020/026611, Notification of Transmittal of The International Search Report and The Written Opinion of the International Searching Authority, or the Declaration, dated Jul. 21, 2020.

* cited by examiner

Top-Level View

Expandible

| Document | Effective Date | Term1 | Term2 | Term3 | Term4 | Term5 | ... | TermN | TermN+1 |
|---|---|---|---|---|---|---|---|---|---|
| Current Document Value | | $Value1_1$ | $Value2_1$ | $Value3_2$ | $Value4_0$ | $Value5_0$ | | $ValueN_1$ | $ValueN+1_0$ |

FIG. 3A

Detail-Level View

Collapsible

| Document | Effective Date | Term1 | Term2 | Term3 | Term4 | Term5 | ... | TermN | TermN+1 |
|---|---|---|---|---|---|---|---|---|---|
| Current Document Value | | $Value1_1$ | $Value2_1$ | $Value3_2$ | $Value4_0$ | $Value5_0$ | | $ValueN_1$ | $ValueN+1_0$ |
| Master Agreement XYZ | 1/1/2015 | $Value1_0$ | $Value2_0$ | $Value3_0$ | $Value4_0$ | $Value5_0$ | | $ValueN_0$ | $ValueN+1_0$ |
| Annex GHI | 11/1/2016 | | | | | | | | |
| Amendment DEF | 11/1/2015 | | $Value2_1$ | | | | | $ValueN_1$ | |
| Amendment JKL | 9/15/2015 | $Value1_1$ | | $Value3_2$ | | | | | |
| Amendment JKL-2 | 2/1/2016 | | | $Value3_2$ | | | | | |
| Statement of Work ABC | 6/1/2015 | | | | $Value4_1$ | $Value5_1$ | | | |
| ... | | | | | | | | | |

Collapsible

FIG. 3B

SYSTEMS AND METHODS FOR GENERATING LOGICAL DOCUMENTS FOR A DOCUMENT EVALUATION SYSTEM

1. CROSS-REFERENCE TO RELATED APPLICATIONS

This application claims priority to U.S. Provisional Patent Application No. 62/828,881 entitled "SYSTEMS AND METHODS FOR GENERATING LOGICAL DOCUMENTS FOR A DOCUMENT EVALUATION SYSTEM" and filed on Apr. 3, 2019, which is hereby incorporated by reference in its entirety.

2. BACKGROUND

Certain embodiments of the present invention are directed to evaluation systems processing textual data. More particularly, some embodiments of the present invention provide systems and methods for generating logical documents for a document evaluation system.

Contracts and agreements are generally amended several times throughout their duration. In an example, a master agreement has been amended by numerous agreements that have been amended by subsequent agreements. This often creates complex relationships between the various documents. For example, some amendments may not reference the master agreement, thus generating multiple degrees (e.g., 2 or 3 degrees) of separation between the source document and its dependent documents. To determine the current or historical status of any term (e.g., any clause, provision and/or paragraph) of the source document therefore requires an extensive review of the entire family of documents that includes the source document and all its dependent documents. For example, the conventional review process typically involves manually reviewing the documents which is very inefficient and prone to human error by the reviewer. These problems are compounded, resulting in inconsistencies and inaccuracies regarding the assessment of document provisions and terms, when numerous reviewers are employed to evaluate a large number of documents across multiple document families. To address these problems, conventional methods generally involve multiple review rounds for quality control that further increase inefficiencies and inconsistencies in the evaluation process. Conventional evaluation systems for large number of documents across many document families are therefore labor intensive, time-consuming, and inefficient.

Hence it is highly desirable to provide and/or improve techniques for generating logical documents for a document evaluation system.

3. SUMMARY

Certain embodiments of the present invention are directed to evaluation systems processing textual data. More particularly, some embodiments of the present invention provide systems and methods for generating logical documents for a document evaluation system.

According to some embodiments, a method for generating logical documents for a document evaluation system includes receiving a first child document associated with a master document. The master document includes one or more master terms. The first child document includes one or more first child terms and a first date. The method further includes generating a logical document based at least in part on the master document. The logical document includes one or more current document values. Each current document value corresponds to one master term and is associated with a current date and a current reference. The current reference identifies a region in the master document related to the one master term. The method further includes selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value.

According to certain embodiments, a system for generating logical documents for a document evaluation system includes one or more processors and a memory storing instructions. The instructions, when executed by the one or more processors, cause the system to perform receiving a first child document associated with a master document. The master document includes one or more master terms. The first child document includes one or more first child terms and a first date. The instructions, when executed by the one or more processors, cause the system to further perform generating a logical document based at least in part on the master document. The logical document includes one or more current document values. Each current document value corresponds to one master term and is associated with a current date and a current reference. The current reference identifies a region in the master document related to the one master term. The instructions, when executed by the one or more processors, cause the system to further perform selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value.

According to some embodiments, a non-transitory computer readable storage medium storing one or more programs is provided. The one or more programs include instructions, when executed by one or more processors, causing a system for generating logical documents for a document evaluation system to perform receiving a first child document associated with a master document. The master document includes one or more master terms. The first child document includes one or more first child terms and a first date. The instructions, when executed by the one or more processors, cause the system to further perform generating a logical document based at least in part on the master document. The logical document includes one or more current document values. Each current document value corresponds to one master term and is associated with a current date and a current reference. The current reference identifies a region in the master document related to the one master term. The instructions, when executed by the one or more processors, cause the system to further perform selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIGS. 3A and 3B are simplified diagrams showing representations of the logical document generated by the document processing component as shown in FIG. 1B according to one embodiment of the present invention.

5. DETAILED DESCRIPTION

Figure 1A:
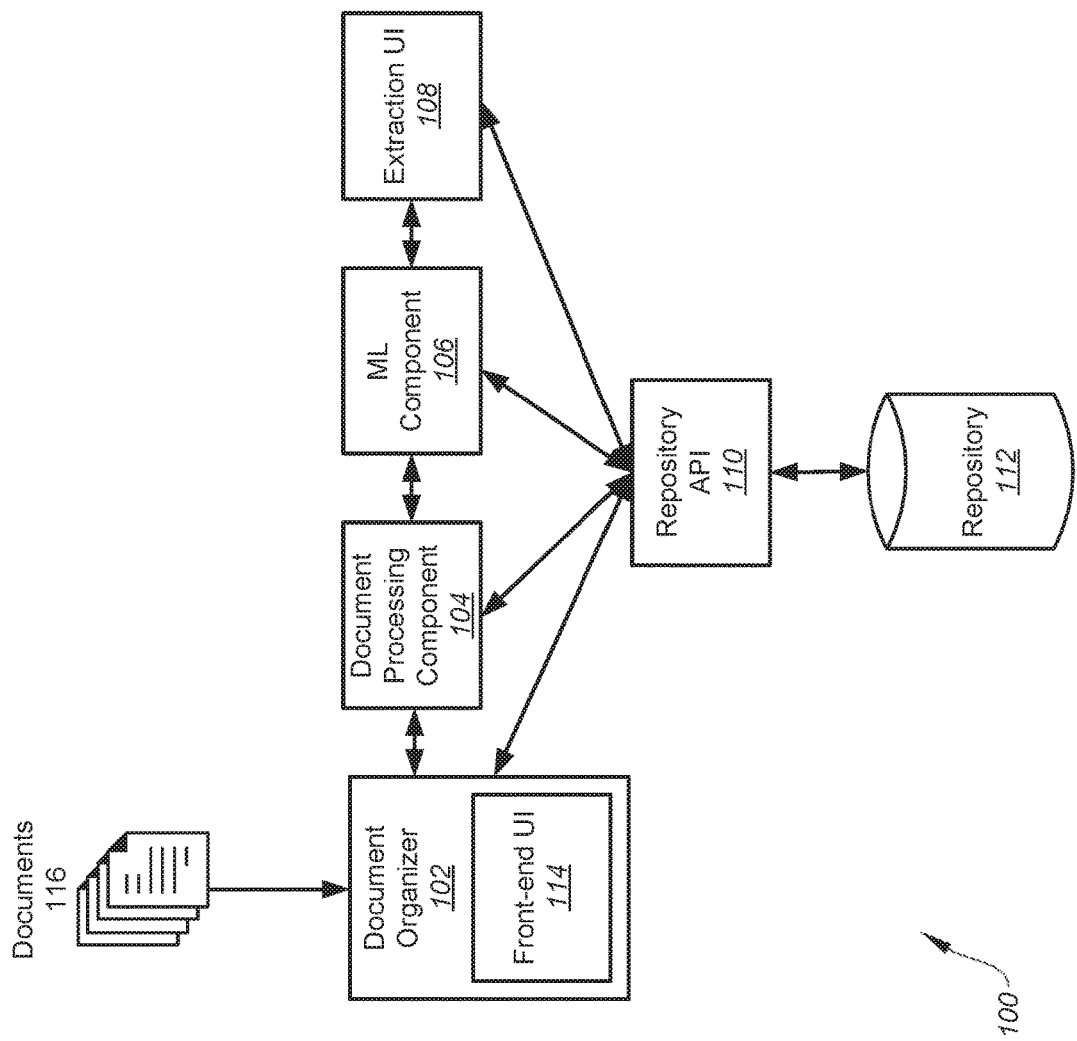
FIG. 1A is a simplified diagram showing a system for generating logical documents for a document evaluation system according to one embodiment of the present invention.

Conventional systems and methods are often not capable of efficiently and/or accurately evaluate large number of documents across multiple document families to determine the current status of all terms (e.g., all clauses, provisions and/or paragraphs) of the source document in a family. For example, conventional systems and methods typically involve manual review of all the documents related to the source document (e.g., the master agreement). In some examples, the manual review process includes manually reviewing sets of documents to: (1) identify all documents within a family, including their terms (e.g., their clauses, provisions and/or paragraphs) that are related to the source document, (2) determine the order of the identified documents based on their effective date or date of execution, and (3) enter the current status for each identified term (e.g., each identified clause, provision and/or paragraph) into a database for later retrieval. Hence, the data provided by conventional systems and methods is generally static and must be manually maintained even though the data can be aggregated and reported across all documents within a particular family. In certain examples, conventional systems and methods therefore lack the capability to automatically and dynamically generate, maintain and/or query the status of document terms and/or relationship attributes of documents within a family throughout the duration of the documents. In addition, conventional systems and methods lack, for example, a user interface to maintain and/or query the status and/or attributes of related documents.

Certain embodiments of the present invention are directed to evaluation systems processing textual data. More particularly, some embodiments of the present invention provide systems and methods for generating logical documents for a document evaluation system. In some embodiments, one or more solutions rooted in computer technology overcome one or more problems specifically arising in the realm of computer technology. In certain embodiments, the systems and methods provide for a document evaluation system that automatically and dynamically adapts to changes in the underlying documents of a particular document family by using logical documents integrated into the evaluation system. For example, new documents of a document family can be added in real-time to update the logical document and accurately reflect the current status of particular terms in the source document of the family. In certain examples, the systems and methods provide a graphical representation (e.g., a timeline) of the logical document indicating changes to the terms of the source document over time. In other examples, the systems and methods provide a user interface that allows a user to view the current status and historical changes of particular terms in the source document based on the logical document. For example, the user interface is configured to provide a link to a region of interest in a document (e.g., a master agreement or a child agreement)

that relates to the current or historical document value corresponding to a particular term.

Benefits of certain embodiments include that the automatic and dynamic nature of generating a logic document based on the documents in a document family. In some embodiments, additional benefits include reducing the amount and cost of employing human reviewers to reconcile terms in the document family. In certain embodiments, other benefits include the ability to group, aggregate, and update document data for dynamically displaying and interacting with the document data in novel and intuitive ways.

FIG. 1A is a simplified diagram showing a system 100 for generating logical documents for a document evaluation system according to one embodiment of the present invention. This diagram is merely an example, which should not unduly limit the scope of the claims. One of ordinary skill in the art would recognize many variations, alternatives, and modifications. The system 100 includes a document organizer component 102, a document processing component 104, a machine learning (ML) component 106, an extraction user interface (UI) component 108, a repository API component 110, and a repository 112. For example, the document organizer component 102 includes a front-end UI component 114 and is configured to organize, categorize, and select documents 116 for storing in the repository 112, and/or further managing and analyzing the documents 116 by the system 100. As an example, the document processing component 104 is included in the repository API component 110.

In some embodiments, documents 116 include textual data and/or content written in natural languages. Examples of documents 116 include contracts, patent licenses, trademark licenses, copyright licenses, technology licenses, joint ventures agreements, confidentiality agreements, research agreements, material supply agreements, manufacturing agreements, statements of work, and amendments and addenda of the forgoing documents. In certain examples, the repository API component 110 is configured to receive data from the document organizer component 102, the document processing component 104, the machine learning component 106, and/or the extraction UI component 108, and store the received data in the repository 112. In other examples, the extraction UI component provides a user interface configured for users to interact with data and documents received from the document organizer component 102, the document processing component 104, the machine learning component 106, and/or the repository API component 110. In some examples, the user interface of the extraction UI component is configured to allow users to interact with data and documents stored in the repository 112.

In certain embodiments, the document processing component 104 is configured to receive data associated with the documents 116 from the document organizer component 102 for further processing. In some examples, the processing by the document processing component 104 includes, for example, applying optical character recognition techniques to the received data of the documents 116. As an example, the document processing component 104 is configured to parse the received data to identify, classify, and mark particular sections within the documents 116. In certain examples, the document processing component 104 is configured to add metadata to the documents 116 based at least in part on the processing of the documents 116. In other examples, the document processing component 104 is configured to convert between formats and/or presentation styles of the data associated with the documents 116, and, for example, generate formatted documents of the converted data. In yet other examples, the document processing component 104 is configured to generate reports, annotations and/or documentations of the processed documents 116.

Figure 1B:
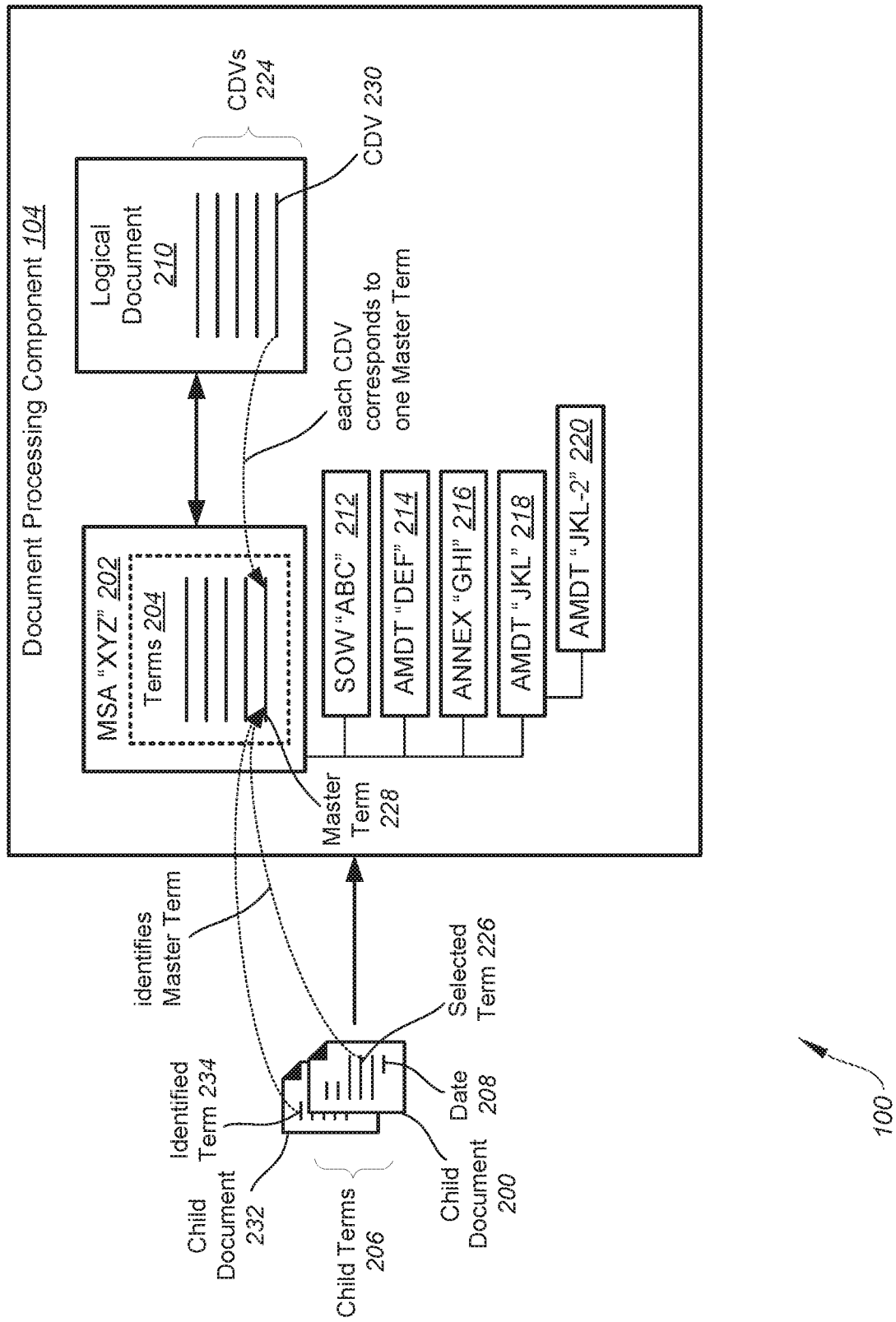
FIG. 1B is a simplified diagram showing the document processing component as part of the system as shown in FIG. 1A according to one embodiment of the present invention.

FIG. 1B is a simplified diagram showing the document processing component 104 as part of the system 100 according to one embodiment of the present invention. This diagram is merely an example, which should not unduly limit the scope of the claims. One of ordinary skill in the art would recognize many variations, alternatives, and modifications. The document processing component 104 is configured to receive a child document 200 associated with a master document 202 (e.g., master agreement "XYZ"). In some examples, the master document 202 includes one or more master terms 204. In certain examples, the child document 200 includes one or more child terms 206 and a date 208. For example, terms of a document include clauses, provisions and/or paragraphs regarding the identity of contracting parties to the document (e.g., names, individuals, corporate entities), the parties' addresses, the purpose of the document, dates and periods (e.g., effective dates, expiration dates, termination periods, contract length), payments, ownership rights, license grants, termination rights, representations, warranties, disclaimers, limitations of liability, indemnifications, liquidated damages, confidentiality rights, default, arbitration, assignment rights, governing law and venue, survival of terms, integration statement, and severability of terms. Examples of document include patent licenses, trademark licenses, copyright licenses, technology licenses, joint venture agreements, confidentiality agreements, research and development agreements, technology or software agreements, manufacturing agreements, leasing agreements, sales agreements, consulting agreements, material transfer agreements, and quality control agreements. As an example, types of documents include agreements, contracts, amendments, addenda, annexures, appendices, attachments, statement of works, price quotes, exhibits, and schedules.

In some embodiments, the document processing component 104 is configured to generate a logical document 210 based at least in part on the master document 202. In some examples, the logical document 210 is associated with the other child documents including, for example, a statement of work 212 (e.g., statement of work "ABC"), an amendment 214 (e.g., amendment "DEF"), an annex 216 (e.g., annex "GHI"), an amendment 218 (e.g., amendment "JKL"), and an amendment 220 (e.g., amendment "JKL-2"). In certain examples, the logical document 210 includes one or more current document values 222. For example, each current document value (CDV) 224 corresponds to one master term 204. As an example, each current document value 224 of the logical document 210 is associated with a current date and a current reference. In one example, the current reference identifies a region in the master document 202 related to the one master term 204.

In certain embodiments, the document processing component 104 is configured to identify the master document 202 (e.g., the master agreement "XYZ") among one or more documents received by the system 100. In some examples, the document processing component 104 is configured to extract one or more terms 204 from the master document 202. For example, the document processing component 104 is configured to assign (e.g., populate) the current document values 224 by using the extracted terms 204. In certain examples, the document processing component 104 is configured to identify one or more child documents 200, 232 that are related to the master document 202. In other examples, the document processing component 104 is configured to create a global scope group and local scope group. For example, the global scope group includes only document that have a scope equal to a global value. As an example, the local scope group includes only documents that have a scope equal to a local value. In one example, a scope of a child document that is equal to a global value indicates that the terms of the child document amend and/or replace the corresponding terms of the master document 202 or add new terms to the master document 202. In another example, a scope of a child document that is equal to a local value indicates that the terms of the child document are limited in scope to the child document. In some examples, the document processing component 104 is configured to group the identified one or more child documents 200, 232 into the global scope group or the local scope group.

According to some embodiments, the document processing component 104 is configured to, for each child documents in the global scope group, sort the child documents based on their effective date from an earliest date to a latest date. In some examples, the document processing component 104 is configured to identify all the terms included in each child document of the global scope group. In certain examples, the document processing component 104 is configured to compare a new document value associated with each identified term of each child document to the current document value of the corresponding term of the master document 202. For example, the document processing component 104 is configured to, if the new document value is not equal to the current document value and if the new document value is not equal to an empty value, replace the current document value associated with the corresponding term of the master document 202 in the logical document 210 with the new document value associated with the identified term of the child document. As an example, the document processing component 104 is configured to assign an empty value to the new document value associated with a term of a child document, if the document processing component 104 is unable to identify a term of the master document 202 that corresponds to the term of the child document associated with the new document value. In some examples, the document processing component 104 is configured to, for each identified term of the child document, store in the logical document 210 a change history of document values associated with the corresponding term of the master document 202. For example, a change history of the document values associated with a term of the master document 202 includes the current document value and historical document values associated with the term of the master document 202. As an example, the change history of the document values includes dates when the document values are changed. In one example, the change history of the document values represents an audit trail that informs a user how often and when changes are made to particular terms in the master document and the child documents.

According to some embodiments, the document processing component 104 is configured to, for each child document in the local scope group, identify all the terms included in each child document of the local scope group. In some examples, the document processing component 104 is configured to filter out the identified terms and separately store the filtered terms in the logical document 210 from the current document values associated with the terms of the master document 202.

In certain embodiments, the document processing component 104 is configured to select a child term 226 from the one or more child terms 206 of the child document 200. In some examples, the document processing component 104 is configured to, if a master term 228 that relates to the selected child term 226 is identified and if the scope of the child document 200 is determined to be equal to a global value, assign a new document value associated with the selected child term 226 to the current document value 230 corresponding to identified master term 228, assign the date 208 to the current date associated with the current document value 230 corresponding to the identified master term 228, and change the current reference associated with the current document value 230 corresponding the identified master term 228 to a first reference. For example, the first reference identifies a region in the child document 200 related to the selected child term 226. In certain examples, the document processing component 104 is configured to, if a master term 228 that relates to the selected child term 226 is identified and if the scope of the child document 200 is determined not to be equal to the global value, add a local document value corresponding to the selected child term 226 to the logical document 210, assign the new document value associated with the selected child term 226 to the local document value, and associated the first reference and the date 208 with the local document value.

According to some embodiments, the document processing component 104 is configured to, for each master term 204, assign an original document value associated with the master term 204 to the current document value 224 corresponding to the master term 204, associate a date of the master document to the current date associated with the current document value 224 corresponding to the master term 204, and generate the current reference associated with the current document value 224 corresponding to the master term 204. For example, the date relates to an effective date of the master document 202.

According to certain embodiments, the document processing component 104 is configured to, if no master term that relates to the selected term 226 is identified and if the scope of the child document 200 is determined to be equal to the global value, add a current document value 224 corresponding to the selected child term 226 to the logical document 210, assign the new document value associated with the selected child term 226 to the added current document value, associate the first reference with a current reference of the added current document value, and associate the date 208 with a current date of the added current document value. For example, the first reference identifies a region in the child document 200 related to the selected child term 226. As an example, the added document value is associated with the current date and the current reference. In some examples, the document processing component 104 is configured to, if no master term that relates to the selected term 226 is identified and if the scope of the child document 200 is determined to not be equal to the global value, add a local document value corresponding to the selected child term 226 to the logical document 210, assign the new document value associated with the selected child term 226 to the local document values, and associated the first reference and the date 208 with the local document value.

In some embodiments, the document processing component 104 is configured to add a historical document value corresponding to the identified master term 228 to the logical document 210. For example, the historical document value is associated with a historical date and a historical reference. In some examples, the document processing component 104 is configured to assign the current date associated with the current document value 230 corresponding to the identified master term 228 to the historical date prior to the assigning the date 208 to the current date associated with the current document value 230 corresponding to the identified master term 228. In certain examples, the document processing component 104 is configured to assign the current reference associated with the current document value 230 corresponding to the identified master term 228 to the historical reference prior to the changing the current reference associated with the current document value 230 corresponding to the identified master term 228 to a first reference. For example, the first reference identifies a region in the child document 200 related to the selected child term 226. As an example, the date 208 relates to an effective date of the child document 200.

In certain embodiments, the document processing component 104 is configured to receive a second child document 232 associated with the master document 202. For example, the second child document includes one or more second child terms and a second date. In some examples, the document processing component 104 is configured to identify a second term 234 of the one or more second terms that relates to the identified master term 228. In certain examples, the document processing component 104 is configured to, if the second term 234 that relates to the identified master term 228 is identified, if the scope of the second child document 232 is determined to be equal to the global value, and if the second date is later than the current date associated with the current document value 230 corresponding to the identified master term 228, assign a new document value associated with the identified second term 234 to the current document value 230 corresponding to the identified master term 228, assign the second date to the current date associated with the current document value 230 corresponding to the identified master term 228, and change the current reference associated with the current document value 230 corresponding to the identified master term 228 to a second reference. For example, the second reference identifies a region in the second child document 232 related to the identified second child term 234.

According to some embodiments, the document processing component 104 is configured to add a historical document value corresponding to the identified master term 228 to the logical document 210. For example, the historical document value is associated with a historical date and a historical reference. In some examples, the document processing component 104 is configured to assign the current document value corresponding to the identified master term 228 to the historical document value prior to the assigning a new document value associated with the identified second child term 232 to the current document value 230 corresponding to the identified master term 228. In certain examples, the document processing component 104 is configured to assign the current date associated with the current document value 230 corresponding to the identified master term 228 to the historical date prior to the assigning the second date of the second child document 232 to the current date associated with the current document value 230 corresponding to the identified master term 228. In some examples, the document processing component 104 is configured to assign the current reference associated with the current document value 230 corresponding to the identified master term 228 to the historical reference prior to the changing the current reference associated with the current document value 230 corresponding to the identified master term 228 to a second reference. For example, the second reference identifies a region in the second child document 232 related to the identified second child term 234. As an example, the second date of the second child document 232 relates to an effective date of the second child document 232.

According to some embodiments, the document processing component 104 is configured to, if the scope of second child document 232 is determined to be equal to the global value and if the second date of the second child document 232 is determined to be equal to or earlier than the current date associated with the current document value 230 corresponding to the identified master term 228, add a historical document value corresponding to the identified master term 228 to the logical document 210, assign the new document value associated with the identified second child term 234 to the historical document value, assign the second date of the second child document 232 to a historical date, and assign the second reference to a historical reference. For example, the historical document value is associated with a historical date and a historical reference. As an example, the second reference identifies a region in the second child document 232 related to the identified second child term 234. In one example, the second date of the second child document 232 relates to an effective date of the second child document 232.

In some embodiments, the document processing component 104 is configured to, if the scope of the second child document 232 is determined to not be equal to the global value, add a local document value corresponding to the identified second child term 234 to the logical document 210, assign the new document value associated with the identified second child term 234 to the local document value, and associate the second reference and the second date with the local document value. For example, the second reference identifies a region in the second child document 232 related to the identified second child term 234. As an example, the second date relates to an effective date of the second child document 232.

In certain embodiments, the logical document 210 includes one or more sets of historical document values. For example, each set corresponds to a document term of a plurality of documents 116 as shown in FIG. 1A. As an example, the plurality of documents 116 includes the master document 202 and a child document 200 associated with the master document 202. In some examples, each historical document value is associated with a historical date and a historical reference. For example, the historical reference identifies a region in a document of the plurality of documents 116 related to the document term. As an example, the historical date relates to an effective date of the document. In certain examples, each set includes one current document value of the one or more current document values 224. For example, the historical date associated with the one current document value relates to the current date. As an example, the historical reference associated with the one current document relates to the current reference.

According to some embodiments, the document processing component 104 is configured to sort each set from an earliest date to a latest date based on the historical dates associated with historical document values in the set. For example, each sorted set represents a timeline of document values corresponding to the document term of the plurality of documents 116. In some examples, the document processing component 104 is configured to receive the plurality of documents 116 as shown in FIG. 1A. For example, the document processing component 104 is configured to identify the master document 202 from the plurality of documents 116. As an example, the document processing component 104 is configured to determine one or more child documents associated with the master document 202 from the plurality of documents 116.

According to certain embodiments, the document processing component 104 is configured to determine the one or more child documents associated with the master document 202 from the plurality of documents 116 based on one or more key terms. For examples, the key terms of a document include the document type, the date of the document (e.g., the effective date), and the parties to the document. As an example, the key terms are predetermined based on user requirements. In some examples, referring to FIG. 1A, the machine learning component 106 is configured to determine the terms (e.g., the key terms) of the plurality of documents 116 by using machine learning and natural language processing (NLP)/text extraction techniques. In certain examples, the front-end UI component 114 is configured to, in response to the confidence of a determined term being smaller than a predetermined threshold, display the determined term and the document associated with the determined term for external review and validation. In some examples, the machine learning component 106 is configured to determine the scope of the one or more child documents associated with the master document 202. For example, the machine learning component 106 is configured to be trained on a set of documents with predetermined scope to determine the scope of documents.

Figure 2:
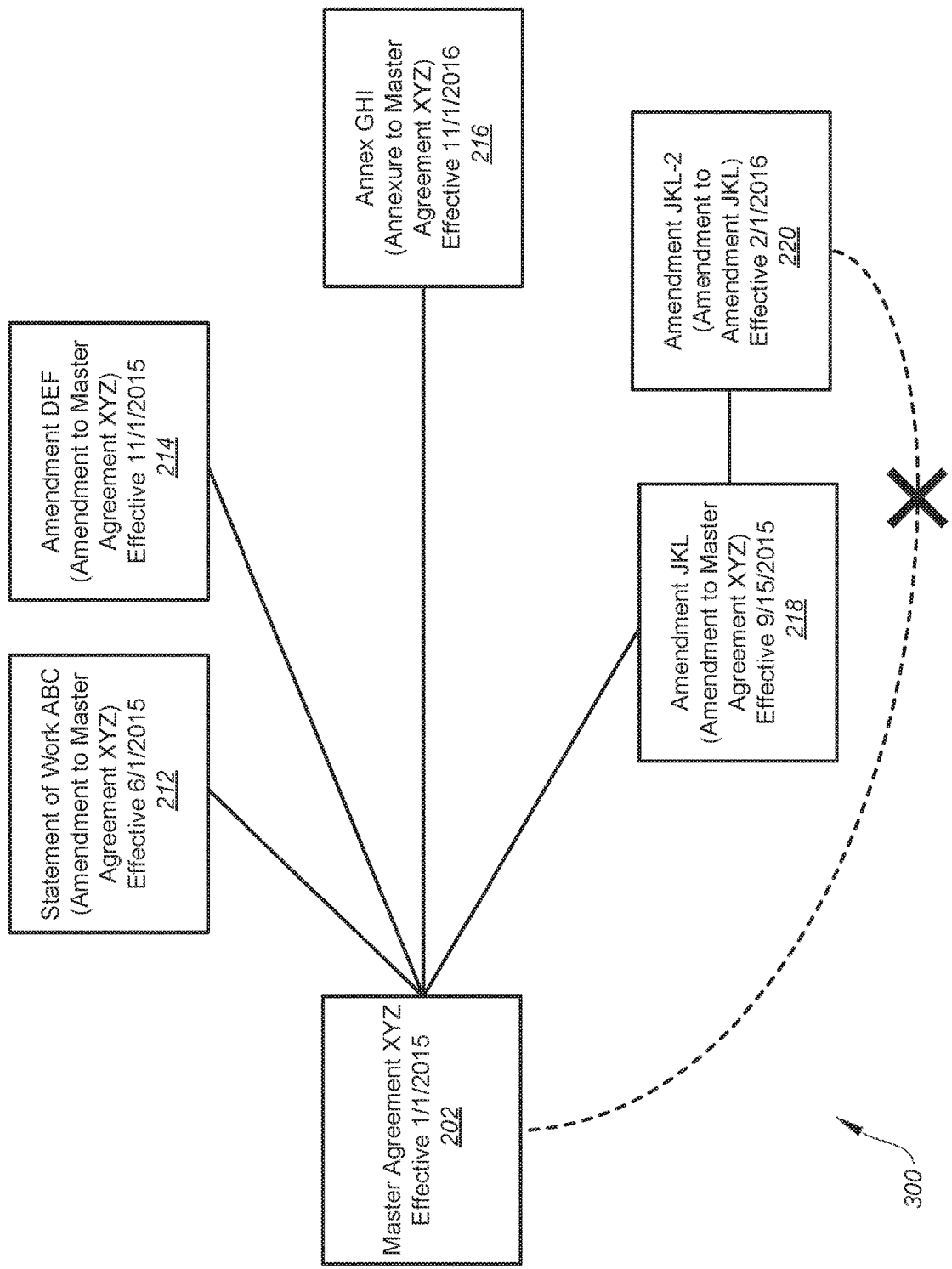
FIG. 2 is a simplified diagram showing relationships of documents used to generate the logical document of the document processing component as shown in FIG. 1B according to one embodiment of the present invention.

FIG. 2 is a simplified diagram showing relationships of documents 300 used to generate the logical document 210 of the document processing component 104 according to one embodiment of the present invention. This diagram is merely an example, which should not unduly limit the scope of the claims. One of ordinary skill in the art would recognize many variations, alternatives, and modifications. In some examples, the relationships of documents 300 include the master document 202 (e.g., the master agreement "XYZ") and child documents associated with the master document 202. In certain examples, the child documents associated with the master document 202 include the statement of work 212 (e.g., the statement of work "ABC"), the amendment 214 (e.g., the amendment "DEF"), the annex 216 (e.g., the annex "GHI"), the amendment 218 (e.g., the amendment "JKL"), and the amendment 220 (e.g., the amendment "JKL-2"). For example, the master document 202 (e.g., the master document "XYZ") includes an effective date of Jan. 1, 2015. As an example, the statement of work 212 (e.g., the statement of work "ABC") represents an amendment to the master document 202 and includes an effective date of Jun. 1, 2015. In one example, the amendment 214 (e.g., the amendment "DEF") represents an amendment to the master document 202 and includes an effective date of Nov. 1, 2015. In another example, the annex 216 (e.g., the annex "GHI") represents an annexure to the master document 202 and includes an effective date of Nov. 1, 2016. For example, the amendment 218 (e.g., the amendment "JKL") represents an amendment to the master document 202 and includes an effective date of Sep. 15, 2015. As an example, the amendment 220 (e.g., the amendment "JKL-2") represents an amendment to the amendment 218 and includes an effective date of Feb. 1, 2016.

In some embodiments, the statement of work 212 (e.g., the statement of work "ABC"), the amendment 214 (e.g., the amendment "DEF"), the annex 216 (e.g., the annex "GHI"), and the amendment 218 (e.g., the amendment "JKL") are directly related to the master document 202 (e.g., the master agreement "XYZ"). In some examples, the statement of work 212 (e.g., the statement of work "ABC"), the amendment 214 (e.g., the amendment "DEF"), the annex 216 (e.g., the annex "GHI"), and the amendment 218 (e.g., the amendment "JKL") include one or more references to the master document 202 (e.g., the master agreement "XYZ") in the document text. In certain examples, the amendment 220 (e.g., the amendment "JKL-2") is not directly related to the master document 202 (e.g., the master agreement "XYZ"). For example, the amendment 220 (e.g., the amendment "JKL-2") is directly related to the amendment 218 (e.g., the amendment "JKL"). As an example, the amendment 220 (e.g., the amendment "JKL-2") includes one or more references to the amendment 218 (e.g., the amendment "JKL") in the document text. In one example, the amendment 220 (e.g., the amendment "JKL-2") does not include any references to the master document 202 (e.g., the master agreement "XYZ") in the document text. In some examples, the amendment 220 (e.g., the amendment "JKL-2") amends one or more terms of the amendment 218 (e.g., the amendment "JKL").

In certain embodiments, the amendment 214 (e.g., the amendment "DEF"), the annex 216 (e.g., the annex "GHI"), the amendment 218 (e.g., the amendment "JKL"), and the amendment 220 (e.g., the amendment "JKL-2") include a scope that is equal to the global value. In some examples, the amendment 214 (e.g., the amendment "DEF"), the annex 216 (e.g., the annex "GHI"), the amendment 218 (e.g., the amendment "JKL"), and the amendment 220 (e.g., the amendment "JKL-2") amend one or more master terms 204 as shown in FIG. 1B. In certain examples, the statement of work 212 (e.g., the statement of work "ABC") includes a scope that is not equal to the global value. For example, the statement of work 212 (e.g., the statement of work "ABC") includes a scope that is equal to the local value.

FIGS. 3A and 3B are simplified diagrams showing representations of the logical document 210 generated by the document processing component 104 according to one embodiment of the present invention. These diagrams are merely examples, which should not unduly limit the scope of the claims. One of ordinary skill in the art would recognize many variations, alternatives, and modifications. Referring to FIG. 3A, in some examples, a representation of the logical document 210 includes a top-level view of the current document values (e.g., the current contract values) included in the logical document 210. For example, the top-level view includes all the terms (e.g., Term1, Term2, Term3, Term4, Term5, . . . , TermN, TermN+1) of the logical document 210 and the current document value (e.g., $Value1_1$, $Value2_1$, $Value3_2$, $Value4_0$, $Value5_0$, . . . , $Value\,N_1$, $ValueN+1_0$) associated with each term shown in a tabular representation. In certain examples, referring to FIG. 1A, the front-end UI component 114 is configured to display the top-level view of the logical document 210 to a user of the system 100. In some examples, the front-end UI component 114 is configured to expand the top-level view to display additional information of the logical document 210 to the user.

In some embodiments, the front-end UI component 114 is configured to display a detail level view of the logical document 210 to the user of the system 100. In some examples, referring to FIG. 3B, the detail level view of the logical document 210 includes a tabular representation of all terms of the logical document 210 and the current document value (e.g., $Value1_1$, $Value2_1$, $Value3_2$, $Value4_0$, $Value5_0$, . . . , $Value\,N_1$, $ValueN+1_0$) associated with each term shown in a tabular representation. In certain examples, the detail level view of the logical document 210 further includes document values of the master document 202 (e.g., the master agreement "XYZ") and each child document 212-220 (e.g., the annex "GHI", the amendment "DEF", the amendment "JKL", the amendment "JKL-2", and the statement of work "ABC") corresponding to each term of the logical document 210. In some examples, the detail level view also includes dates for each document (e.g., the master agreement "XYZ", the annex "GHI", the amendment "DEF", the amendment "JKL", and the amendment "JKL-2", and the statement of work "ABC"). For example, the dates of each document relate to the effective date of the document.

In certain embodiments, the current documents values and the other document values are displayed in a particular order in the tabular representation of the detail level view. For example, the current document values and the document values of the master document 202 are displayed in the first and second row of the tabular representation of the logical document 210, respectively. As an example, the document values of the child documents 212-218 (e.g., the annex "GHI", the amendment "DEF", the amendment "JKL", and the statement of work "ABC") are displayed based on the date associated with each document with later documents being placed higher than earlier documents in the tabular representation of the logical document 210. In one example, the child document 220 (e.g., the amendment "JKL-2") are displayed in a row following the child document 218 (e.g., the amendment "JKL") that the document 220 directly relates to.

According to some embodiments, the document processing component 104 is configured to extract a document value (e.g., a $Value3_0$) for Term3 from the master document 202 (e.g., the master agreement "XYZ") and assign the extracted value (e.g., the $Value3_0$) to the current document value for Term3. For example, the document processing component 104 is configured to extract a document value (e.g., a $Value3_1$) for Term3 from the child document 218 (e.g., the amendment "JKL") in response to determining the scope of child document 218 to be equal to the global value. As an example, the document processing component 104 is configured to assign the extracted document value (e.g., the $Value3_1$) to the current document value for Term3 in response to determining that the extracted document value (e.g., $Value3_1$) is not equal to the current document value (e.g., the $Value3_0$) for Term3. In one example, the document processing component 104 is configured to indicate in the graphical representation of the logical document 210 that the current document value for Term3 is changed to the extracted document value (e.g., the $Value3_1$) on the date (e.g., Sep. 15, 2015) of the child document 218 (e.g., the amendment "JKL").

According to certain embodiments, the document processing component 104 is configured to extract a document value (e.g., a $Value3_2$) for Term3 from the child document 220 (e.g., the amendment "JKL-2") in response to determining the scope of child document 220 to be equal to the global value. As an example, the document processing component 104 is configured to assign the extracted document value (e.g., the $Value3_2$) to the current document value for Term3 in response to determining that the extracted document value (e.g., the $Value3_2$) is not equal to the current document value (e.g., the $Value3_1$) for Term3. In one example, the document processing component 104 is configured to indicate in the graphical representation of the logical document 210 that the current document value for Term3 is changed to the extracted document value (e.g., the $Value3_2$) on the date (e.g., Feb. 1, 2016) of the child document 220 (e.g., the amendment "JKL-2").

In some embodiments, the document processing component 104 is configured to extract document value (e.g., $Value4_0$ and $Value5_0$) for Term4 and Term5, respectively, from the master document 202 (e.g., the master agreement "XYZ") and assign the extracted values (e.g., $Value4_0$ and $Value5_0$) to the current document values for the respective Term4 and Term5. For example, the document processing component 104 is configured to extract document values (e.g., $Value4_1$ and $Value5_1$) for Term4 and Term5, respectively, from the child document 212 (e.g., the statement of work "ABC"). In some examples, the document processing component 104 is configured to not assign the extracted document values (e.g., $Value4_1$ and $Value5_1$) to the current document values for the respective Term4 and Term5 in response to determining the scope of the child document 212 (e.g., the statement of work "ABC") to be equal to the local scope. In certain examples, the document processing component 104 is configured to indicate in the graphical representation of the logical document 210 that the extracted document values (e.g., $Value4_1$ and $Value5_1$) represent local document values for Term4 and Term5, respectively.

In certain embodiments, the document processing component 104 is configured to extract a document value (e.g., a $ValueN+1_0$) from the child document 216 (e.g., the annex "GHI"). For example, the document processing component 104 is configured to determine that the extracted document value (e.g., the $ValueN+1_0$) corresponds to a new term not present in the master document 202 or the other child documents 212, 214, 218, 220 (e.g., the statement of work "ABC", the amendment "DEF", the amendment "JKL", and the amendment "JKL-2") predating the child document 216 (e.g., the annex "GHI"). In some examples, the document processing component 104 is configured to add a new term (e.g., a TermN+1) to the logical document 210 and assign the extracted document value (e.g., the $ValueN+1_0$) to the current document value of the added new term (e.g., TermN+1). In certain examples, referring to FIG. 1A, the front-end UI component 114 is configured to collapse the detail level view of the logical document 210 to the top-level view.

According to some embodiments, graphical representations of the logical document 210 as shown in FIGS. 2A and 2B include references that identify regions in the master document or the child documents corresponding to the document values included in the logical document 210. For example, the identified regions represent textual data in the master document or the child documents related to document values of the logical document 210. As an example, referring to FIG. 1A, the front-end UI component 114 is configured to provide links to the identified regions in the top-level view and the detail level view of the logical document 210 so that, in response to clicking on a link, the identified region associated with the link is displayed to the user. For example, the front-end UI component 114 is configured to display a view of the document including the identified region in PDF format by overlaying a JSON representation of the document. As an example, the JSON representation includes positional data of the identified region and the textual data of the identified region. In one example, the document processing component 104 is configured to process the textual data of the identified region using optical character recognition.

Figures 4A, 4B:
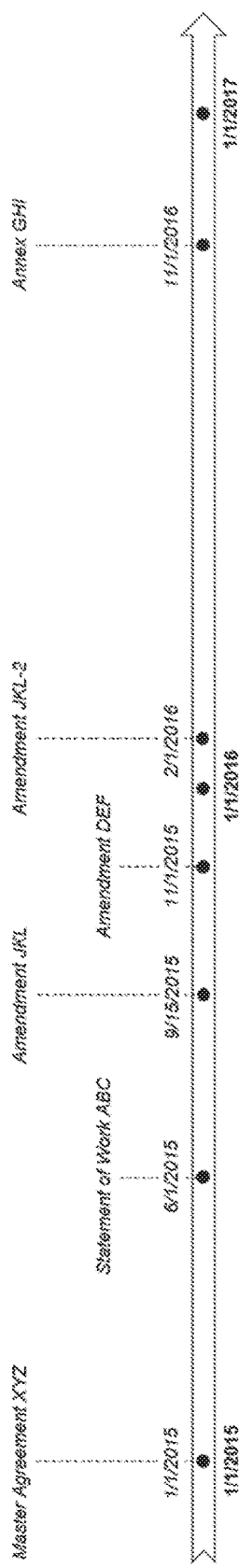
FIGS. 4A and 4B are simplified diagrams showing representations of the logical document generated by the document processing component as shown in FIG. 1B according to one embodiment of the present invention.

FIGS. 4A and 4B are simplified diagrams showing representations of the logical document 210 generated by the document processing component 104 according to one embodiment of the present invention. These diagrams are merely examples, which should not unduly limit the scope of the claims. One of ordinary skill in the art would recognize many variations, alternatives, and modifications. Referring to FIG. 4A, in some examples, a representation of the logical document 210 includes a timeline view of the master document 202 (e.g., the master document "XYZ") and the child documents 212-220 (e.g., the statement of work "ABC", the amendment "JKL", the amendment "DEF", the amendment "JKL-2", and the annex "GHI") indicating the dates of the master document 202, its child documents 212-220, and the current date. Referring to FIG. 4B, in certain examples, a representation of the logical document 210 includes a tabular representation of the transposed detail level view of the logical document 210, as shown in FIG. 3B, with rows representing terms and columns representing document dates. In some examples, the document processing component 104 is configured to determine the document value for a particular date and term and display all determined document values in the transposed detail level view of the logical document 210. For example, the transposed detail level view of the logical document 210 is configured to identify active document values (e.g., changing document values) at milestones in the document lifecycle and provide a footprint for particular terms and/or for the entire document family. For example, a footprint allows users to review a playbook usage of the documents included in the logical document 210 and identify regular deviations from standard terms among the documents.

In some embodiments, referring to FIG. 1A, the front-end UI component 114 is configured to display a rolled-up version of the master document 202 (e.g., the master agreement "XYZ") based on the logical document 210 by adding to or replacing the original textual data of a term in the master document 202 with textual data from the child document, which amends the original textual data.

Figure 5:
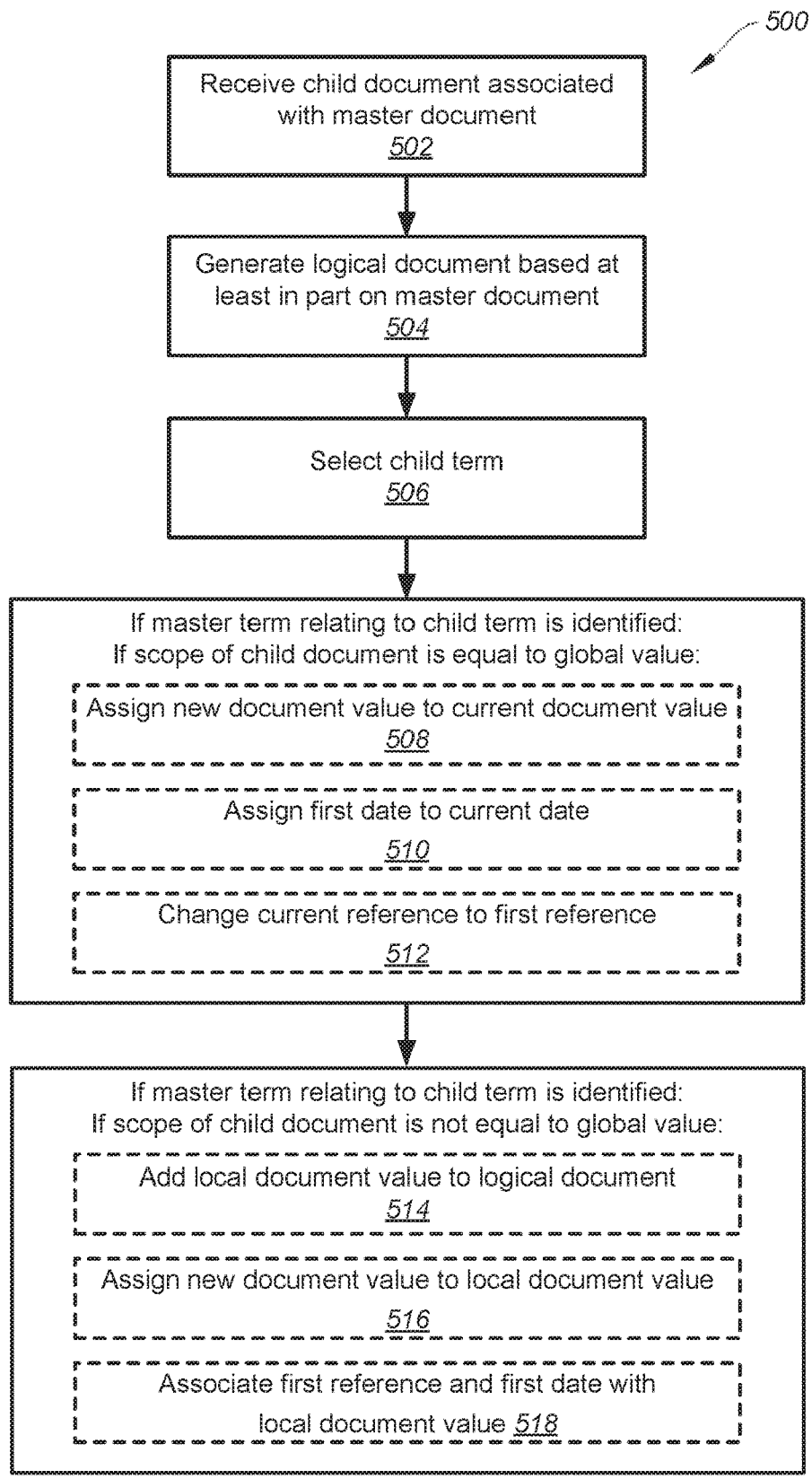
FIG. 5 is a simplified diagram showing a method for generating logical documents for a document evaluation system according to one embodiment of the present invention.

FIG. 5 is a simplified diagram showing a method for generating logical documents for a document evaluation system according to one embodiment of the present invention. This diagram is merely an example, which should not unduly limit the scope of the claims. One of ordinary skill in the art would recognize many variations, alternatives, and modifications. The method 500 includes processes 502-518 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 500 are performed by the system 100. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 502, a child document associated with a master document is received. The master document includes one or more master terms. The child document including one or more child terms and a first date. At the process 504, a logical document is generated based at least in part on the master document. The logical document includes one or more current document values. Each current document value corresponds to one master term and is associated with a current date and a current reference. The current reference identifies a region in the master document related to the one master term. At process 506, a child term from the one or more child terms is selected. In response to identifying a master term that relates to the selected child term and in response to determining that the scope of the child document is equal to a global scope, at process 508, a new document value associated with the selected child term is assigned to the current document value corresponding to the identified master term, at process 510, the first date is assigned to the current date associated with the current document value corresponding to the identified master term, and, at process 512, the current reference associated with the current document value corresponding to the identified master term is changed to a first reference. The first reference identifies a region in the child document related to the selected child term. In response to identifying a master term that relates to the selected child term and in response to determining that the scope of the child document is not equal to a global scope, at process 514, a local document value corresponding to the selected child term is added to the logical document, at process 516, the new document value associated with the selected child term is assigned to the local document value, and at process 518, the first reference and the first date is associated with the local document value.

Figure 6:
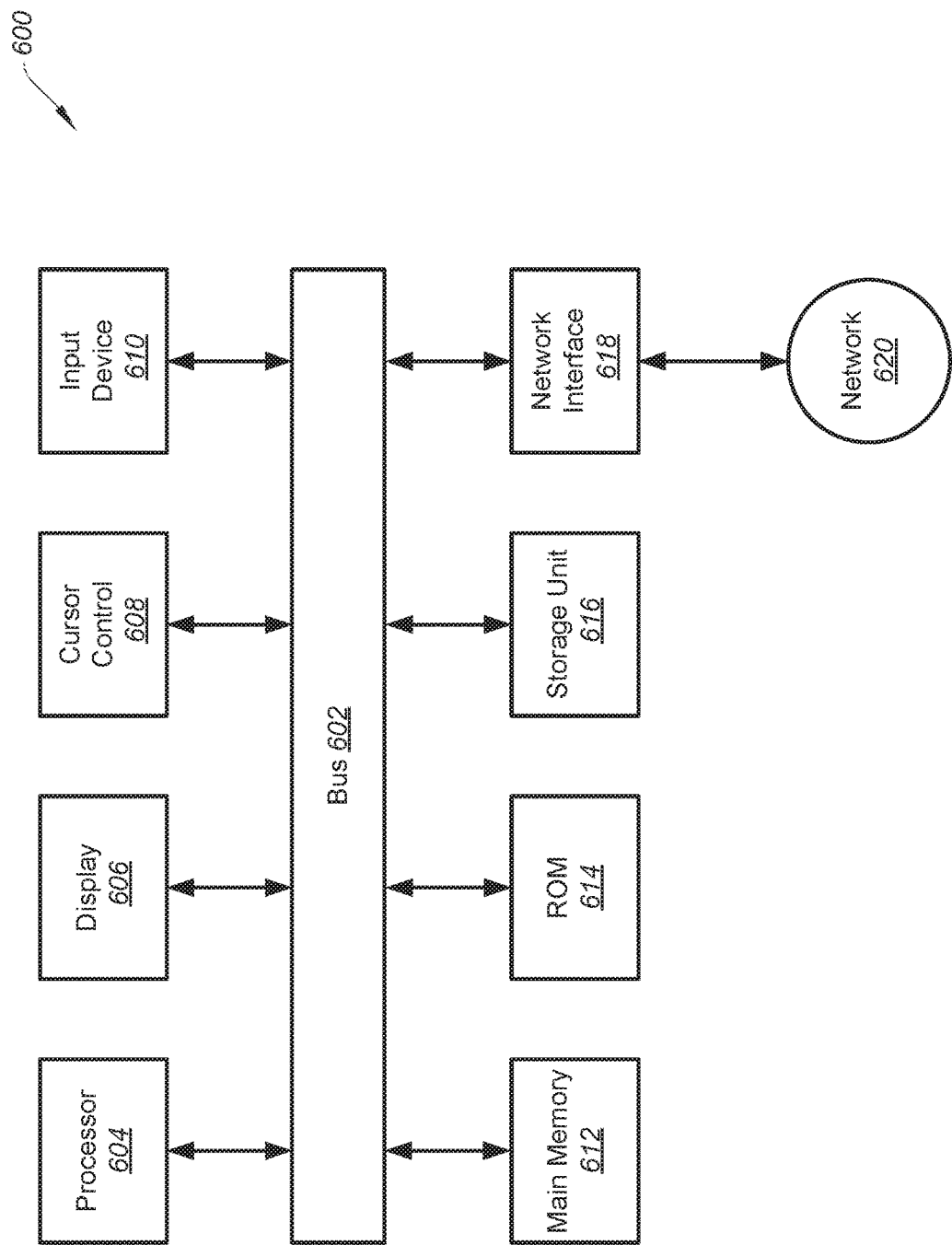
FIG. 6 is a simplified diagram showing a computing system for implementing a system for generating logical documents for a document evaluation system according to one embodiment of the present invention.

FIG. 6 is a simplified diagram showing a computing system for implementing a system for adaptive training of a machine learning system processing textual data according to one embodiment of the present invention. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 400 are performed by the computing system 600. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to some embodiments, a method for generating logical documents for a document evaluation system includes receiving a first child document associated with a master document. The master document includes one or more master terms. The first child document includes one or more first child terms and a first date. The method further includes generating a logical document based at least in part on the master document. The logical document includes one or more current document values. Each current document value corresponds to one master term and is associated with a current date and a current reference. The current reference identifies a region in the master document related to the one master term. The method further includes selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value. For example, the method is implemented according to at least FIG. 1B, FIG. 3A, FIG. 3B, FIG. 4B and/or FIG. 5.

In some examples, the generating a logical document based at least in part on the master document includes, for each master term: assigning an original document value associated with the master term to the current document value corresponding to the master term; associating a second date of the master document to the current date associated with the current document value corresponding to the master term; and generating the current reference associated with the current document value corresponding to the master term. The second date relates to an effective date of the master document.

In certain examples, the method further includes, in response to not identifying any master term that relates to the selected first child term, in response to determining that the scope of the first child document is equal to the global value: adding a current document value corresponding to the selected first child term to the logical document; assigning the new document value associated with the selected first child term to the added current document value; associating the first reference with the current reference of the added current document value; and associating the first date with the current date of the added current document value. The added document value is associated with a current date and a current reference. In response to determining that the scope of the first child document is not equal to the global value: a local document value corresponding to the selected first child term is added to the logical document; the new document value associated with the selected first child term is assigned to the local document value; and the first reference and the first date are associated with the local document value.

In some examples, the method further includes: adding a historical document value corresponding to the identified master term to the logical document. The historical document value is associated with a historical date and a historical reference. The current document value corresponding to the identified master term is assigned to the historical document value prior to the assigning a new document value associated with the selected first child term to the current document value corresponding to the identified master term. The current date associated with the current document value corresponding to the identified master term is assigned to the historical date prior to the assigning the first date to the current date associated with the current document value corresponding to the identified master term. The current reference associated with the current document value corresponding to the identified master term is assigned to the historical reference prior to the changing the current reference associated with the current document value corresponding to the identified master term to a first reference. The first date relates to an effective date of the first child document.

In certain examples, the method further includes: receiving a second child document associated with the master document. The second child document includes one or more second child terms and a second date. A second child term of the one or more second child terms that relates to the identified master term is identified. In response to identifying a second child term of the one or more second terms that relates to the identified master term, in response to determining that the scope of the second child document is equal to the global value and the second date is later than the current date associated with the current document value corresponding to the identified master term: a new document value associated with the identified second child term is assigned to the current document value corresponding to the identified master term; the second date is assigned to the current date associated with the current document value corresponding to the identified master term; and the current reference associated with the current document value corresponding to the identified master term is changed to a second reference. The second reference identifies a region in the second child document related to the identified second child term.

In some examples, the method further includes: adding a historical document value corresponding to the identified master term to the logical document. The historical document value is associated with a historical date and a historical reference. The current document value corresponding to the identified master term is assigned to the historical document value prior to the assigning a new document value associated with the identified second child term to the current document value corresponding to the identified master term. The current date associated with the current document value corresponding to the identified master term is assigned to the historical date prior to the assigning the second date to the current date associated with the current document value corresponding to the identified master term. The current reference associated with the current document value corresponding to the identified master term is assigned to the historical reference prior to the changing the current reference associated with the current document value corresponding to the identified master term to a second reference. The second date relates to an effective date of the second child document.

In certain examples, the method further includes, in response to determining that the scope of the second child document is equal to the global value and the second date is equal to or earlier than the current date associated with the current document value corresponding to the identified master term: adding a historical document value corresponding to the identified master term to the logical document; assigning the new document value associated with the identified second child term to the historical document value; assigning the second date to the historical date; and assigning the second reference to the historical reference. The historical document value is associated with a historical date and a historical reference. The second date relates to an effective date of the second child document.

In some examples, the method further includes in response to determining that the scope of the second child document is not equal to the global value: adding a local document value corresponding to the identified second child term to the logical document; assigning the new document value associated with the identified second child term to the local document value; and associating the second reference and the second date with the local document value.

In certain examples, the logical document further includes one or more sets of historical document values. Each set corresponds to a document term of a plurality of documents. The plurality of documents includes the master document and a child document associated with the master document. For example, each historical document value is associated with a historical date and a historical reference. The historical reference identifies a region in a document of the plurality of documents related to the document term. The historical date relates to an effective date of the document. As an example, each set includes one current document value of the one or more current document values. The historical date associated with the one current document value relates to the current date. The historical reference associated with the one current document relates to the current reference.

In some examples, the method further includes sorting each set from an earliest date to a latest date based on the historical dates associated with historical document values in the set. Each sorted set represents a timeline of document values corresponding to the document term of the plurality of documents. In certain examples, the receiving a first child document associated with a master document includes: receiving a plurality of documents; identifying the master document from the plurality of documents; determining one or more child documents associated with the master document from the plurality of documents; and selecting the first child document from the one or more child documents. In certain examples, the one or more master terms include clauses, provisions and paragraphs regarding an identity of contracting parties, dates and periods, payments, ownership rights, license grants, termination rights, representations, warranties, disclaimers, limitations of liability, indemnifications, assignment rights, governing law, and venue.

In certain examples, the receiving a first child document associated with a master document includes identifying the one or more master terms and the one or more first child terms by using a machine learning system. For example, the receiving a first child document associated with a master document further includes identifying the first child document among a plurality of document by using a machine learning system. As an example, the identifying the first child document among a plurality of document is based on one or more key terms including a document type of the first document, the first date, and parties to the first child document.

According to certain embodiments, a system for generating logical documents for a document evaluation system includes one or more processors and a memory storing instructions. The instructions, when executed by the one or more processors, cause the system to perform receiving a first child document associated with a master document. The master document includes one or more master terms. The first child document includes one or more first child terms and a first date. The instructions, when executed by the one or more processors, cause the system to further perform generating a logical document based at least in part on the master document. The logical document includes one or more current document values. Each current document value corresponds to one master term and is associated with a current date and a current reference. The current reference identifies a region in the master document related to the one master term. The instructions, when executed by the one or more processors, cause the system to further perform selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value. For example, the system is implemented according to at least FIG. 1B, FIG. 3A, FIG. 3B, and FIG. 4B.

In some examples, the logical document further includes one or more sets of historical document values. Each set corresponds to a document term of a plurality of documents, the plurality of documents including the master document and a child document associated with the master document. For example, each historical document value is associated with a historical date and a historical reference. The historical reference identifies a region in a document of the plurality of documents related to the document term. The historical date relates to an effective date of the document. As an example, each set includes one current document value of the one or more current document values. The historical date associated with the one current document value relates to the current date. The historical reference associated with the one current document relates to the current reference.

In certain examples, the instructions, when executed by the one or more processors, cause the system to further perform: sorting each set from an earliest date to a latest date based on the historical dates associated with historical document values in the set. Each sorted set represents a timeline of document values corresponding to the document term of the plurality of documents. In some examples, the receiving a first child document associated with a master document includes: receiving a plurality of documents; identifying the master document from the plurality of documents; determining one or more child documents associated with the master document from the plurality of documents; and selecting the first child document from the one or more child documents.

According to some embodiments, a non-transitory computer readable storage medium storing one or more programs is provided. The one or more programs include instructions, when executed by one or more processors, causing a system for generating logical documents for a document evaluation system to perform receiving a first child document associated with a master document. The master document includes one or more master terms. The first child document includes one or more first child terms and a first date. The instructions, when executed by the one or more processors, cause the system to further perform generating a logical document based at least in part on the master document. The logical document includes one or more current document values. Each current document value corresponds to one master term and is associated with a current date and a current reference. The current reference identifies a region in the master document related to the one master term. The instructions, when executed by the one or more processors, cause the system to further perform selecting a first child term from the one or more first child terms. In response to identifying a master term that relates to the selected first child term and in response to determining that the scope of the first child document is equal to a global value: a new document value associated with the selected first child term is assigned to the current document value corresponding to the identified master term; the first date is assigned to the current date associated with the current document value corresponding to the identified master term; and the current reference associated with the current document value corresponding to the identified master term is changed to a first reference. The first reference identifies a region in the first child document related to the selected first child term. In response to identifying a master term that relates to the selected first child term and in response to determining that the scope of the first child document is not equal to the global value: a local document value corresponding to the selected first child term is assigned to the logical document; the new document value associated with the selected first child term is assigned to the local document value; and the first reference and the first date is associated with the local document value. For example, the non-transitory computer readable storage medium is implemented according to at least FIG. 1B, FIG. 3A, FIG. 3B, and FIG. 4B.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for generating logical documents for a document evaluation system, the method comprising:
    receiving a first child document associated with a master document, the master document including one or more master terms, the first child document including one or more first child terms and a first date relating to an effective date of the first child document,
    generating a logical document that reflects a current status of the master document in relation to one or more child documents, the logical document including one or more current document values, each current document value corresponding to one master term and being associated with a current date and a current reference, the current reference identifying a region in the master document related to the one master term;
    selecting a first child term from the one or more first child terms;
    in response to identifying a master term that relates to the selected first child term:
        in response to determining that the scope of the first child document is equal to a global value:
            assigning a new document value associated with the selected first child term to the current document value corresponding to the identified master term;
            assigning the first date to the current date associated with the current document value corresponding to the identified master term; and
            changing the current reference associated with the current document value corresponding to the identified master term to a first reference, the first reference identifying a region in the first child document related to the selected first child term; and
        in response to determining that the scope of the first child document is not equal to the global value:
            adding a local document value corresponding to the selected first child term to the logical document;
            assigning the new document value associated with the selected first child term to the local document value; and
            associating the first reference and the first date with the local document value; and
    overlaying on the one or more current document values of the logical document one or more links that refer to a positional data of the identified region and a textual data of the identified region.

2. The method of claim 1 wherein the generating a logical document includes, for each master term:
    assigning an original document value associated with the master term to the current document value corresponding to the master term;
    associating a second date of the master document to the current date associated with the current document value corresponding to the master term; and
    generating the current reference associated with the current document value corresponding to the master term;
    wherein the second date relates to an effective date of the master document.

3. The method of claim 1, and further comprising:
    in response to not identifying any master term that relates to the selected first child term:
        in response to determining that the scope of the first child document is equal to the global value:
            adding a current document value corresponding to the selected first child term to the logical document, the added document value being associated with a current date and a current reference;
            assigning the new document value associated with the selected first child term to the added current document value;
            associating the first reference with the current reference of the added current document value; and
            associating the first date with the current date of the added current document value; and
        in response to determining that the scope of the first child document is not equal to the global value:
            adding a local document value corresponding to the selected first child term to the logical document;
            assigning the new document value associated with the selected first child term to the local document value; and
            associating the first reference and the first date with the local document value.

4. The method of claim 1, and further comprising:
    adding a historical document value corresponding to the identified master term to the logical document, the historical document value being associated with a historical date and a historical reference;
    assigning the current document value corresponding to the identified master term to the historical document value prior to the assigning a new document value associated with the selected first child term to the current document value corresponding to the identified master term;
    assigning the current date associated with the current document value corresponding to the identified master term to the historical date prior to the assigning the first date to the current date associated with the current document value corresponding to the identified master term; and
    assigning the current reference associated with the current document value corresponding to the identified master term to the historical reference prior to the changing the current reference associated with the current document value corresponding to the identified master term to a first reference;
    wherein the first date relates to an effective date of the first child document.

5. The method of claim 1, and further comprising:
receiving a second child document associated with the master document, the second child document including one or more second child terms and a second date;
identifying a second child term of the one or more second child terms that relates to the identified master term;
in response to identifying a second child term of the one or more second terms that relates to the identified master term:
in response to determining that the scope of the second child document is equal to the global value and the second date is later than the current date associated with the current document value corresponding to the identified master term:
assigning a new document value associated with the identified second child term to the current document value corresponding to the identified master term;
assigning the second date to the current date associated with the current document value corresponding to the identified master term; and
changing the current reference associated with the current document value corresponding to the identified master term to a second reference, the second reference identifying a region in the second child document related to the identified second child term.

6. The method of claim 5, and further comprising:
adding a historical document value corresponding to the identified master term to the logical document, the historical document value being associated with a historical date and a historical reference;
assigning the current document value corresponding to the identified master term to the historical document value prior to the assigning a new document value associated with the identified second child term to the current document value corresponding to the identified master term;
assigning the current date associated with the current document value corresponding to the identified master term to the historical date prior to the assigning the second date to the current date associated with the current document value corresponding to the identified master term; and
assigning the current reference associated with the current document value corresponding to the identified master term to the historical reference prior to the changing the current reference associated with the current document value corresponding to the identified master term to a second reference;
wherein the second date relates to an effective date of the second child document.

7. The method of claim 5, and further comprising:
in response to determining that the scope of the second child document is equal to the global value and the second date is equal to or earlier than the current date associated with the current document value corresponding to the identified master term:
adding a historical document value corresponding to the identified master term to the logical document, the historical document value being associated with a historical date and a historical reference;
assigning the new document value associated with the identified second child term to the historical document value;
assigning the second date to the historical date; and
assigning the second reference to the historical reference;
wherein the second date relates to an effective date of the second child document.

8. The method of claim 5, and further comprising:
in response to determining that the scope of the second child document is not equal to the global value:
adding a local document value corresponding to the identified second child term to the logical document;
assigning the new document value associated with the identified second child term to the local document value; and
associating the second reference and the second date with the local document value.

9. The method of claim 1 wherein:
the logical document further includes one or more sets of historical document values; and
each set corresponds to a document term of a plurality of documents, the plurality of documents including the master document and a child document associated with the master document.

10. The method of claim 9 wherein:
each historical document value is associated with a historical date and a historical reference;
the historical reference identifies a region in a document of the plurality of documents related to the document term; and
the historical date relates to an effective date of the document.

11. The method of claim 10 wherein:
each set includes one current document value of the one or more current document values;
the historical date associated with the one current document value relates to the current date; and
the historical reference associated with the one current document relates to the current reference.

12. The method of claim 11, and further comprising:
sorting each set from an earliest date to a latest date based on the historical dates associated with historical document values in the set;
wherein each sorted set represents a timeline of document values corresponding to the document term of the plurality of documents.

13. The method of claim 1 wherein the receiving a first child document associated with a master document includes:
receiving a plurality of documents;
identifying the master document from the plurality of documents;
determining one or more child documents associated with the master document from the plurality of documents; and
selecting the first child document from the one or more child documents.

14. The method of claim 1 wherein the one or more master terms include clauses, provisions and paragraphs regarding an identity of contracting parties, dates and periods, payments, ownership rights, license grants, termination rights, representations, warranties, disclaimers, limitations of liability, indemnifications, assignment rights, governing law, and venue.

15. The method of claim 1 wherein the receiving a first child document associated with a master document includes identifying the one or more master terms and the one or more first child terms by using a machine learning system.

16. The method of claim 15 wherein the receiving a first child document associated with a master document further includes identifying the first child document among a plurality of documents by using a machine learning system.

17. The method of claim 16 wherein the identifying the first child document among the plurality of documents is based on one or more key terms including a document type of the first document, the first date, and parties to the first child document.

18. A system for generating logical documents for a document evaluation system, the system comprising:
one or more processors; and
a memory storing instructions, the instructions, when executed by the one or more processors, causing the system to perform:
receiving a first child document associated with a master document, the master document including one or more master terms, the first child document including one or more first child terms and a first date relating to an effective date of the first child document,
generating a logical document that reflects a current status of the master document in relation to one or more child documents, the logical document including one or more current document values, each current document value corresponding to one master term and being associated with a current date and a current reference, the current reference identifying a region in the master document related to the one master term;
selecting a first child term from the one or more first child terms;
in response to identifying a master term that relates to the selected first child term:
in response to determining that the scope of the first child document is equal to a global value:
assigning a new document value associated with the selected first child term to the current document value corresponding to the identified master term;
assigning the first date to the current date associated with the current document value corresponding to the identified master term; and
changing the current reference associated with the current document value corresponding to the identified master term to a first reference, the first reference identifying a region in the first child document related to the selected first child term; and
in response to determining that the scope of the first child document is not equal to the global value:
adding a local document value corresponding to the selected first child term to the logical document;
assigning the new document value associated with the selected first child term to the local document value; and
associating the first reference and the first date with the local document value; and
overlaying on the one or more current document values of the logical document one or more links that refer to a positional data of the identified region and a textual data of the identified region.

19. The system of claim 18 wherein:
the logical document further includes one or more sets of historical document values; and
each set corresponds to a document term of a plurality of documents, the plurality of documents including the master document and a child document associated with the master document.

20. The system of claim 19 wherein:
each historical document value is associated with a historical date and a historical reference;
the historical reference identifies a region in a document of the plurality of documents related to the document term; and
the historical date relates to an effective date of the document.

21. The system of claim 20 wherein:
each set includes one current document value of the one or more current document values;
the historical date associated with the one current document value relates to the current date; and
the historical reference associated with the one current document relates to the current reference.

22. The system of claim 21 wherein the instructions, when executed by the one or more processors, cause the system to further perform:
sorting each set from an earliest date to a latest date based on the historical dates associated with historical document values in the set;
wherein each sorted set represents a timeline of document values corresponding to the document term of the plurality of documents.

23. The system of claim 18 wherein the receiving a first child document associated with a master document includes:
receiving a plurality of documents;
identifying the master document from the plurality of documents;
determining one or more child documents associated with the master document from the plurality of documents; and
selecting the first child document from the one or more child documents.

24. A non-transitory computer readable storage medium storing one or more programs, the one or more programs comprising instructions, when executed by one or more processors, causing a system for generating logical documents for a document evaluation system to perform:
receiving a first child document associated with a master document, the master document including one or more master terms, the first child document including one or more first child terms and a first date relating to an effective date of the first child document,
generating a logical document that reflects a current status of the master document in relation to one or more child documents, the logical document including one or more current document values, each current document value corresponding to one master term and being associated with a current date and a current reference, the current reference identifying a region in the master document related to the one master term;
selecting a first child term from the one or more first child terms;
in response to identifying a master term that relates to the selected first child term:
in response to determining that the scope of the first child document is equal to a global value:
assigning a new document value associated with the selected first child term to the current document value corresponding to the identified master term;
assigning the first date to the current date associated with the current document value corresponding to the identified master term; and
changing the current reference associated with the current document value corresponding to the identified master term to a first reference, the first reference identifying a region in the first child document related to the selected first child term; and in response to determining that the scope of the first child document is not equal to the global value:
adding a local document value corresponding to the selected first child term to the logical document;
assigning the new document value associated with the selected first child term to the local document value; and associating the first reference and the first date with the local document value; and overlaying on the one or more current document values of the logical document one or more links that refer to a positional data of the identified region and a textual data of the identified region.

\* \* \* \* \*